United States Patent
Krivos et al.

(10) Patent No.: US 11,266,271 B2
(45) Date of Patent: Mar. 8, 2022

(54) MOTOR MAGNETIC INTERFERENCE RING

(71) Applicant: Vita-Mix Management Corporation, Olmsted Township, OH (US)

(72) Inventors: Brenton Krivos, Brunswick, OH (US); David Kolar, Stow, OH (US); Eric Miller, Olmsted Township, OH (US); Saifur Tareen, Copley, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 579 days.

(21) Appl. No.: 15/836,179

(22) Filed: Dec. 8, 2017

(65) Prior Publication Data
US 2018/0160855 A1 Jun. 14, 2018

Related U.S. Application Data

(60) Provisional application No. 62/431,634, filed on Dec. 8, 2016.

(51) Int. Cl.
| | |
|---|---|
| *A47J 43/046* | (2006.01) |
| *B01F 13/04* | (2006.01) |
| *A47J 43/08* | (2006.01) |
| *A47J 43/07* | (2006.01) |

(52) U.S. Cl.
CPC ....... *A47J 43/0465* (2013.01); *A47J 43/0761* (2013.01); *A47J 43/08* (2013.01); *A47J 43/085* (2013.01); *B01F 13/047* (2013.01)

(58) Field of Classification Search
CPC .... A47J 43/0465; A47J 43/0761; A47J 43/08; A47J 43/085; A47J 43/0766; A47J 43/0777; B01F 13/047

USPC .......................................................... 366/274
See application file for complete search history.

(56) References Cited

U.S. PATENT DOCUMENTS

| | | | |
|---|---|---|---|
| 2,955,186 | A | 10/1960 | Ritter |
| 3,299,226 | A | 1/1967 | Edwards |
| 3,548,280 | A | 12/1970 | Cockroft |
| 3,731,059 | A | 5/1973 | Wilson |
| 3,943,421 | A | 3/1976 | Shibata et al. |
| 3,951,351 | A | 4/1976 | Ernster et al. |
| 4,568,193 | A | 2/1986 | Contri et al. |

(Continued)

FOREIGN PATENT DOCUMENTS

| | | |
|---|---|---|
| CN | 200939970 | 8/2007 |
| CN | 101194807 | 6/2008 |

(Continued)

OTHER PUBLICATIONS

Machine translation of JP-2012254125, accessed via https://worldwide.espacenet.com/ on Mar. 10, 2020, published 2012.*

(Continued)

*Primary Examiner* — Marc C Howell
(74) *Attorney, Agent, or Firm* — McDonald Hopkins LLC

(57) ABSTRACT

A blender system that includes a base that is selectively and operatively engaged with a container is shown and described herein. The blender system may include a container. The container may include a magnet and may be engagable with a blade base. The blade base may include a switch that responds to the magnet. The blender system may include a shield that shields the magnet and switch from a magnetic field generated by operation of a motor.

16 Claims, 5 Drawing Sheets

(56) References Cited

U.S. PATENT DOCUMENTS

| | | | |
|---|---|---|---|
| 4,686,356 A | | 8/1987 | Ueda et al. |
| 4,762,057 A | | 8/1988 | Hirota et al. |
| 4,822,172 A | | 4/1989 | Stottmann |
| 4,893,942 A | | 1/1990 | Stottmann |
| 4,968,864 A | | 11/1990 | Doi et al. |
| 4,991,973 A | * | 2/1991 | Maaz ................. B01F 13/0818 177/212 |
| 5,156,867 A | | 10/1992 | Leuthold et al. |
| 5,267,211 A | | 11/1993 | Kobayashi et al. |
| 5,267,790 A | | 12/1993 | Sutherland et al. |
| 5,316,382 A | | 5/1994 | Penaranda et al. |
| 5,347,205 A | | 9/1994 | Piland |
| 5,363,746 A | | 11/1994 | Gordon |
| 5,392,695 A | | 2/1995 | Junkel |
| 5,531,153 A | | 7/1996 | Maruyama et al. |
| 5,556,198 A | | 9/1996 | Dickson, Jr. et al. |
| 5,562,020 A | | 10/1996 | Shigeshiro |
| 5,577,735 A | | 11/1996 | Reed et al. |
| 5,605,090 A | | 2/1997 | Mantani et al. |
| 5,660,467 A | | 8/1997 | Mineo et al. |
| 5,768,978 A | | 6/1998 | Dorner et al. |
| 5,829,341 A | | 11/1998 | Lin |
| 5,839,356 A | | 11/1998 | Dornbush et al. |
| 5,967,021 A | | 10/1999 | Tung |
| 6,155,113 A | | 12/2000 | Swon |
| 6,210,033 B1 | | 4/2001 | Karkos, Jr. et al. |
| 6,364,522 B2 | | 4/2002 | Kolar et al. |
| 6,402,365 B1 | | 6/2002 | Wong |
| 6,609,821 B2 | | 8/2003 | Wulf et al. |
| 6,959,562 B2 | | 11/2005 | Navedo et al. |
| 7,422,362 B2 | | 9/2008 | Sands |
| 7,892,497 B2 | * | 2/2011 | Shibata ................. B01F 13/089 422/135 |
| 2002/0009017 A1 | | 1/2002 | Kolar et al. |
| 2002/0176320 A1 | | 11/2002 | Wulf et al. |
| 2004/0203387 A1 | | 10/2004 | Grannan |
| 2005/0229795 A1 | | 10/2005 | Stuckey |
| 2006/0086843 A1 | | 4/2006 | Lin et al. |
| 2006/0169715 A1 | | 8/2006 | Emmendorfer et al. |
| 2006/0203610 A1 | | 9/2006 | Bohannon, Jr. et al. |
| 2006/0214765 A1 | | 9/2006 | Pitchers et al. |
| 2007/0221668 A1 | | 9/2007 | Baarman et al. |
| 2008/0221739 A1 | | 9/2008 | Pryor |
| 2009/0084274 A1 | * | 4/2009 | Kovacic ................. A47J 43/06 99/492 |
| 2009/0225626 A1 | | 9/2009 | Baumfalk |
| 2010/0260005 A1 | * | 10/2010 | Bodum ................. A47J 27/004 366/144 |
| 2011/0189358 A1 | | 8/2011 | Herbert |
| 2011/0199852 A1 | | 8/2011 | Martin |
| 2011/0203515 A1 | * | 8/2011 | Krautter ................. C30B 7/08 117/69 |
| 2011/0248108 A1 | | 10/2011 | Carriere |
| 2011/0283897 A1 | * | 11/2011 | Fang ................. A47J 43/044 99/495 |
| 2013/0042767 A1 | * | 2/2013 | Alet Vidal ......... B01F 13/0845 99/357 |
| 2013/0192477 A1 | | 8/2013 | Hoare |
| 2014/0247686 A1 | * | 9/2014 | Arnett ................. A47J 43/046 366/205 |
| 2014/0286120 A1 | | 9/2014 | Kolar |

FOREIGN PATENT DOCUMENTS

| | | | |
|---|---|---|---|
| CN | 201899991 | | 7/2011 |
| CN | 202312540 | | 7/2012 |
| JP | 2012254125 A | * | 12/2012 |
| WO | WO2005031952 | | 4/2005 |
| WO | WO2006104651 | | 10/2006 |
| WO | WO2006124051 | | 11/2006 |

OTHER PUBLICATIONS

Copenheaver, Blaine, International Search Report and Written Opinion, PCT/US2014/029134, dated Aug. 1, 2014, International Search Authority/USA.

Young, Lee W., International Search Report and Written Opinion, PCT/US2014/029384, dated Aug. 11, 2014, International Search Authority/USA.

Gaggia Espanola, S.A., ipanerma, brochure, undated.

Gaggia Espanola, S.A., Copacabana, brochure, undated.

Gaggia Espanola, S.A., ipanema Space-Saving High Technology, brochure, undated.

* cited by examiner

MOTOR MAGNETIC INTERFERENCE RING

CROSS-REFERENCE TO RELATED APPLICATION

This application claims priority to U.S. Provisional Patent Application No. 62/431,634 entitled "MOTOR MAGNETIC INTERFERENCE RING," filed on Dec. 8, 2016, which is incorporated herein by reference in its entirety.

TECHNICAL FIELD

The present teachings relate to an interlock for a blender, and more particularly, to a blender system utilizing wireless power transmission for interlocking the blender system.

BACKGROUND

Blender systems are often used to blend and process foodstuffs. Conventional blenders generally include a base with a motor and a mixing container with an operable mixing blade disposed therein. A blender lid is adapted to cover the mixing container. A user inserts contents within the mixing container to be mixed by the rotation of the blade. The container is positioned on the base as a user controls the operation of the motor within the base to rotate the mixing blade within the container to mix the contents therein. It may be desirable to generally prevent the mixing blades from rotating when the blender lid is removed from the container.

In other blending systems, a blade may be removably attached to a container. For example, personal or single serving blending containers are attachable to a blade assembly. The single serving containers and attached blade assembly are then positioned on a blender base. It may be desirable to prevent the blade assembly from rotating when the single serving blending container is not attached or not operatively attached to the blade assembly.

Interlock systems may be utilized to attempt to prevent the blades from rotating at certain times. These interlock systems generally prevent the operation of the rotation of the mixing blade unless the blender lid is covering the mixing container. Known blending interlock systems have been disclosed by U.S. Pat. No. 8,403,556 to Wu to include a latch cover mechanism with a link rod and a compression spring in communication with a power circuit control switch in the base of the blender. Additionally, U.S. Pat. No. 8,702,300 to Audette discloses a blending apparatus having a container, a lid for covering the container, and an attachment within the container. The attachment engages the lid and a drive member at the base of the blender to actuate a motor once the lid is secured to the container.

Typically, known blender interlocks require a physical connection between the lid and the motor. These interlocks generally include a system of mechanical arms, links, springs or other attachments that prevent the user from operating the motor to rotate the mixing blade unless the blender lid is secured onto the container. Generally, known blender system mechanical interlocks are subject to damage or failure caused by the vibrations of the operating motor, normal wear, users, or the like. These interlock mechanisms can fail and cause a false actuation, giving a signal the blender lid is in place when, in fact, it is not. Further still, these mechanical systems may be difficult to clean.

Additionally, mechanical interlock systems take up extra space for mechanical connection paths, and these connection paths may not allow for sufficient vibration isolation or damping.

Furthermore, traditional blender systems may be designed to utilize a particular blending container with a particular blending base. For example, a blender base may have a dedicated blending container that is designed to attach to the blender base. If a user attaches the wrong blending container to the blender base, then the blender may not function properly. This can lead to spilled contents, excess noise, improper functioning of the blades, or the like.

Therefore, a need exists for improved blender systems.

SUMMARY

A blender system may include a blender base, a container and a blade assembly that are operably engaged with each other. The blade base may include a switch. The container may include a trigger that activates the switch when the blade base and the container are interlocked. The blender base may control the operation of a motor based on whether the switch is activated. The blender system may include a shield that shields the switch and trigger from a magnetic field generated by the motor.

A described blender system includes a base including a motor, a container comprising at least one magnet, and a blade base operatively attachable to the container and the base, the blade base comprising a switch that interacts with the magnet when the magnet is within an operating range of the switch, and a shield comprising a metal body that is disposed between the switch and the motor of the base when the blade base is operatively attached to the container and the base. The metal body comprises steel. The container may comprise at least two magnets. In another aspect, a magnet may comprise an arc-shape, and the arc-shape may be generally at least seventy-five degrees. It is noted that the container comprises an inner layer and an outer layer, and wherein the magnet is disposed between the inner layer and the outer layer. The switch may comprise a reed switch.

Also described is a blender system for blending foodstuff, the blender system comprising a base comprising a housing and a motor, a container comprising a magnet disposed proximal to an opening of the container, a blade base operatively attachable to the container and the base, the blade base comprising at least one switch that operatively alters a state based on interactions with the magnet, and a shield comprising a metal body that is disposed between the at least one switch and the motor of the base when the blade base is operatively attached to the base. In an aspect, the shield may be disposed within the base. In another aspect the shield may be disposed within the blade base. The at least one switch may comprise a reed switch. The at least one switch operatively enables operation of the motor when the magnet is within an operating field of the at least one switch and disables operation of the motor when the magnet is not within the operating filed of the at least one switch. The shield may further comprise a carrier coupled with the metal body. The carrier may be over molded with the metal body. The blade base further comprises a nut, a shaft, and at least one blade, and wherein the carrier is operatively attached to the nut. The blade base is operatively attachable with at least one other container having a different volume than the container.

Further described is a container system for blending foodstuff with a blender base, the container system comprising a container comprising an open end and a closed end, the open end comprising at least one magnet disposed therein or thereon, and a blade base operatively attachable to the open end, and comprising: a puck comprising a general disk shape; at least one reed switch; and a shield member comprising an annular metal body disposed about the puck, wherein the shield member operatively shields the at least one reed switch from a magnetic field of a blender base. The at least one reed switch may comprise two reed switches equally spaced about the blade base. The at least one magnet may comprise an arch that is at least generally seventy degrees such that the at least one magnet operatively interacts with at least one of the two reed switches when the container and blade base are operatively attached. In another aspect the blade base and the container form a seal when operatively attached.

DESCRIPTION OF THE DRAWINGS

The present teachings may be better understood by reference to the following detailed description taken in connection with the following illustrations, wherein.

DETAILED DESCRIPTION

Figure 1:
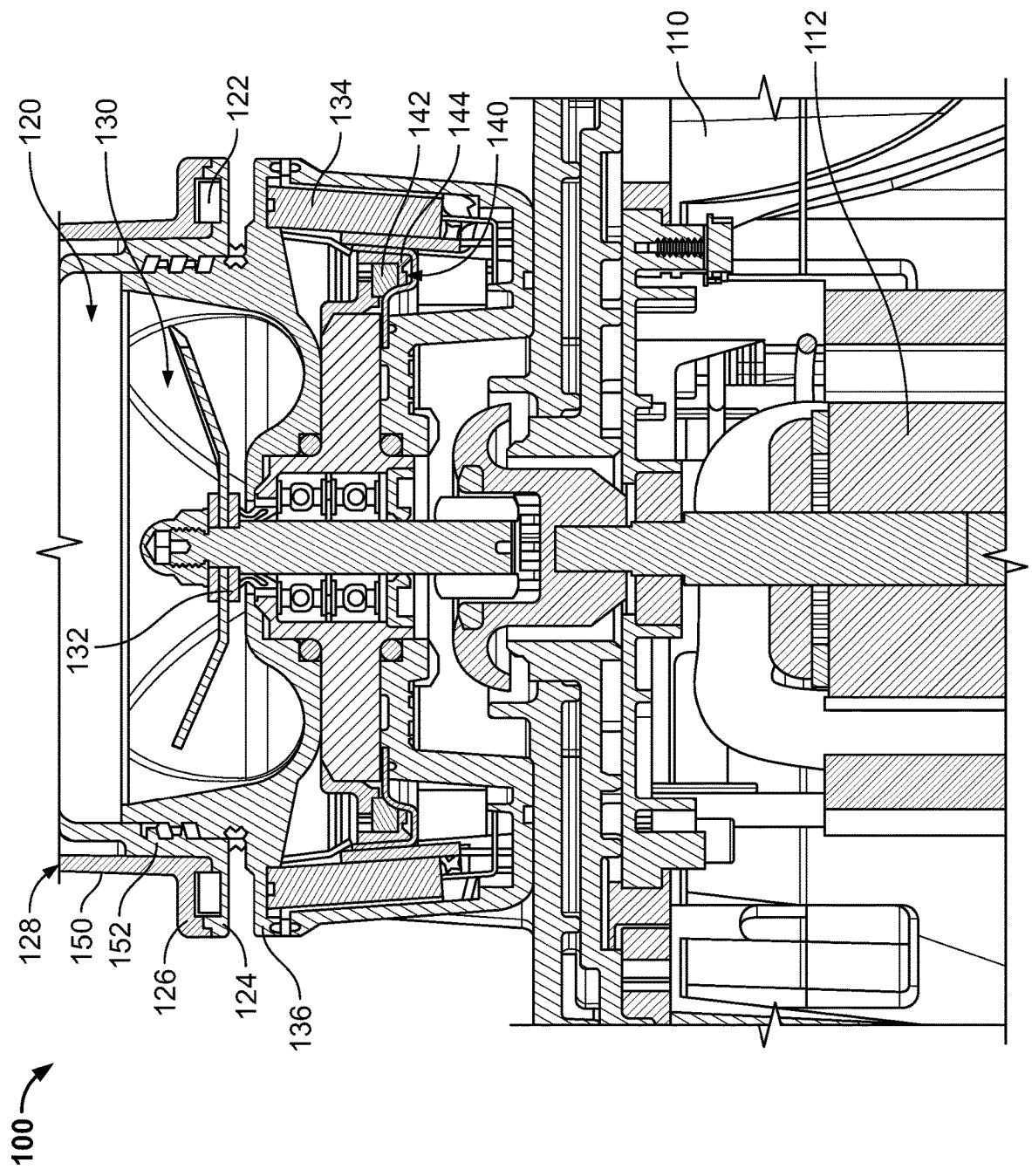
FIG. 1 is a cross-sectional view of an embodiment of a blender system having a shield and a switch in accordance with the present disclosure.

Reference will now be made in detail to embodiments of the present teachings, examples of which are illustrated in the accompanying drawings. It is to be understood that other embodiments may be utilized, and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that references to a blender, blender system, and the like, are understood to include food processor systems, and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending system may be powered in any appropriate manner, such as disclosed in U.S. patent application Ser. No. 14/213,557, entitled Powered Blending Container, which is hereby incorporated by reference.

Furthermore, while blending of "ingredients," "contents," or "foodstuffs" is described by various embodiments, it is noted that non-food stuff may be mixed or blended, such as paints, epoxies, construction material (e.g., mortar, cement, etc.), and the like. Moreover, blending of ingredients may result in a blended product. Such blended products may include drinks, frozen drinks, smoothies, shakes, soups, purees, sorbets, butter (nut), dips or the like. Accordingly, such terms may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Embodiments described herein may refer to single serving containers. A "single serving" container does not indicate a limited use for the container, but rather refers to a differently configured container that may be attached to a blade base. Such containers may have a closed end that is generally distal from a blender base when the container, blade base, and blender base are interlocked. The container may be any desired shape, such as a cup, bowl, pitcher, or the like. A user, for example, places foodstuff in the container and then attaches a blade base to the container. When operatively attached, the container and attached blade base are inverted and placed on a blender base. The blender base may then drive a blade assembly of the blade base.

A blending system with interlocking capabilities is described herein. In an aspect, embodiments generally include a blender base (housing a motor), a switch, a container, and a blade base. In an aspect, the blender system can determine whether the blender base, container, and blade base are "interlocked" (e.g., they are in an operative position whereby a user is prevented from contacting the blades). The container may include a trigger that interacts with the switch. The switch may comprise, for instance, a reed switch and the trigger may comprise a magnet that interacts with the reed switch. Activation or closing of the reed switch may indicate that the container and the blade base are interlocked. When closed, the reed switch may communicate such to the blender base (e.g., a processor or switch with the blender base). The blender base may use this information to determine whether the reed switch is closed, and may permit operation of the motor based on this information, such as disclosed in U.S. patent application Ser. No. 14/195,159 and Ser. No. 14/214,063, entitled BLENDING SYSTEM, which are hereby incorporated by reference.

In some blender systems, the blender base houses a motor that may, when operating, produce a magnetic field. The magnetic field exerts force(s) on objects within its field. Certain motors may generate larger magnetic fields than others. For instance, a motor may comprise a y horsepower (hp) motor, where y is a number (e.g., y=2, 2.1, 2.3, 2.4, etc.). The greater the hp, the larger the magnetic field may be. It is noted that the relationship to hp and magnetic fields may not be the same for all motors. The magnetic field generated by the motor may interfere with the reed switch detecting whether the container and the blade base are interlocked. For instance, the motor may generate sufficient magnetic force to allow the reed switch to recognize or sense the presence of the container. This issue may occur when a single serving container is utilized with a large format blender base and motor. As such, large format blender bases may be limited to only using large format containers and may not be designed to receive single serving containers with reed switches. In another instance, a dedicated single server blender base may also generate enough magnetic force to interfere with a reed switch.

Embodiments described herein may include a shield that magnetically shields or blocks the magnetic field from interfering with the reed switch. The shield may comprise a metallic material that prevents or reduces the magnetic field from a motor interfering with a reed switch. In an example, the shield may be disposed generally between the motor and the reed switch or portions thereof.

It is noted that the blender systems may include shields that prevent interference to other sensors or components. For instance, a blender system may utilize NFC, RFID, or other sensors. As another example, described shields may block magnetic interference from the motor to a blender display, or the like. In another aspect, sensors (e.g., RFID sensor) may be powered by electromagnetic induction from magnetic fields produced by a reader. For instance, an identification tag may include an NFC component that uses induction between two loop antennas located within the container's near field, effectively forming an air-core transformer. The antennas may comprise various materials, such as copper. While embodiments may describe air-coil transformer, various other antenna formations may be utilized.

Referring now to FIG. 1, there depicted is a cross-sectional view of a blending system 100 in an interlocked state. The blender system may primarily include a base 110, a container 120, and a blade base 130. The base 110 may be any appropriate size and configuration. The base 110 may house and generally protect the operative components of the blending system 100, such as a motor 112 and other components (e.g., fan, controllers, circuitry, and human interfaces). The base 110 may include a power source (e.g., battery) or may be in communication with a power source (e.g., power mains) that may power the motor and other components (e.g., a display, lighting, or the like).

Container 120 may include and/or be coupled with a blade base 130. As described herein, the container 120 may comprise appropriate configurations to allow for holding and mixing foodstuff therein. It is noted that the container 120 may comprise materials such as metals, plastics, glass, or other food grade materials. Container 120 may be configured according to a desired embodiment. While the container 120 may have various embodiments such as a single serving container, a large format container, or the like, examples generally refer to the container 120 as a single serving container for sake of brevity. It is noted that the various aspects disclosed herein, however, may be applicable to other forms of containers. In another aspect, base 110 may operatively receive or couple with different, interchangeable containers.

The blade base 130 may be attached or coupled to an open end 124 of the container 120. The blade base 130 may include an agitator or blade assembly 132. The blade assembly 132 (e.g., which may include blades, mixers, shafts, bearings, etc.) may be of appropriate configurations and may operatively rotate within the container 120 (e.g., via a motor). For instance, a user may place foodstuff in the container 120 and may then attach the blade base 130 to the container 120. In an example, the user may spin or rotate the blade base 130 relative the container 120 to screw the blade base 130 onto the container 120. Once operatively attached, the blade base 130 and the container 120 may be inverted and placed on the base 110 to allow blade assembly 122 to chop, mix, blend, or otherwise interact with the foodstuff.

In an interlocked state, the container 120, base 110, and blade base 130 may be interconnected in an appropriate manner. For instance, blade base 130 may be attached or coupled to an open end 124 of container 120. According to an embodiment, the lid 130 may be press-fit (e.g., friction fit), twisted (e.g., via threaded members), latched, or otherwise connected with the open end 124. It is noted that lid 130 and container 120 may be coupled via various other means, including magnetic means, mechanical fasteners, or the like. In an example, the container 120 and blade base 130 may be screwed or threaded together to form a seal.

The container 120 may include an actuator or trigger 122 that may trigger a switch 134 of the blade base 130. When the container 120 and blade base 130 are operatively connected, the trigger 122 may interact (e.g., actuate, activate, etc.) the switch 134. In an example, the switch 134 may comprise a reed switch or other switch that uses magnetic properties. The trigger 122 may comprise a magnet that interacts with the reed switch. When a magnet is within range of a reed switch, the reed switch will react or change states (e.g., move from an open state to a closed state). This may signify that the container 120 and the blade base 130 are operatively connected. The switch 134 may send a signal to or otherwise communicate with the base 110 when the container 120 and blade base 130 are connected and operatively placed on the base 110, such as through a wireless connection, a physical connection, induction, or the like. When operatively connected, the base 110 may allow for operation of the motor 112. If not operatively connected, the base 110 may prevent or disable operation of the motor 112.

Operation of the motor 112 may generate a magnetic field. In some prior systems, the magnetic field may extend to and interact with the switch 134. This may, for example, cause a reed switch to be opened or closed depending on the design of the system. In some systems, the blender system 100 may interpret the blender system 100 as either interlocked or not interlocked (depending on the operative preference) and the blender system 100 may either enable or disable (e.g., turn-off) the motor when the reed switch is open. For instance, this may interfere with (e.g., stop or start) motor operation at non-operative times. It is noted that the blender system 100 may include any number of switches or triggers.

The blender system 100 may include shield 140 that blocks or shields the switch 134 from the motor's 112 magnetic field to prevent or reduce the magnetic field from opening or closing the switch 134. As used herein, and unless context suggests otherwise, blocking or shielding may refer to preventing or reducing the effect of the magnetic field on the switch 134. The shield 140 may include a metallic body 142. The body 142 may comprise a metal that dampens or blocks magnetic forces from the motor 112. This may prevent interference with the switch 134. While embodiments may describe body 142 as metal or metallic, it is noted that the body may include other materials that generally shield the switch 134. Body 142 may be disposed within a carrier 144. For instance, the body 142 may be over-molded with a plastic or other material. This may allow for ease of production and may protect the body 142.

The shield 140 may be appropriately shaped and disposed in a desired location. In an example, the shield 140 may be disposed within the blade base 130. In other embodiments, the shield 140 may be disposed at other locations operatively between the switch 140 and the motor 112. For instance, the shield 140 may be disposed within the base 110, above the base 110, between the blade base 130 and the base 110, or the like. Moreover, the shield 140 may comprise an appropriate shape. In the illustration, the shield 140 may comprise an annular ring or frame shape. In another example, the shield 140 may comprise a plate disposed within or on the base 110. It is further noted that the shield 140 may comprise one or more pieces, may be unitarily formed, may comprise separate constructions, or the like.

In some blending systems, the size or power of the motor 112 may contribute to generating a magnetic field that is strong enough to interfere with switch 134. As an example, base 110 may comprise a blender base that may be capable of large format blending. Large format blending may require greater horsepower motors than small format or single serving-style blenders. As such, large format blenders may generate a greater magnetic field than small format blenders. These magnetic fields may interfere with switches responsive to magnetic forces. The shield 140 may allow single serving-style containers or blade bases with the switch 134 to be utilized with these large format blending containers by blocking or shielding magnetic fields.

It is noted that the shield 140 may be utilized for blending systems designed for single serving use, large format use, or multipurpose use. Moreover, shield 140 may be utilized with large format blending containers.

Figure 2:
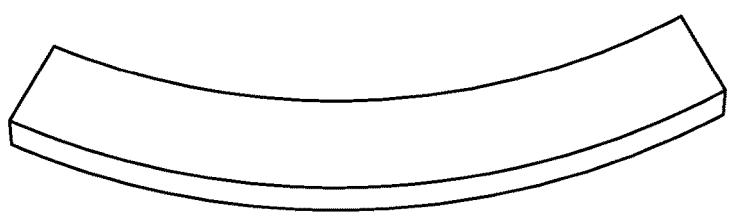
FIG. 2 is a top view of a magnet trigger for a blender container in accordance with various disclosed aspects.
Figure 3:
FIG. 3 is a top view of another magnet trigger for a blender container in accordance with various disclosed aspects.

Turning now to FIGS. 2 and 3, with reference to FIG. 1, there are magnets 200 and 300. Trigger 122 may comprise magnets 200 or 300. Magnet 200 comprises a generally fifty-degree arc and magnet 300 comprises a generally seventy-five degree arc. In an aspect, trigger 122 may comprise multiple magnets disposed generally on or within the container 120. For simplicity, an embodiment with magnet 300 is described herein. While specific degrees of arcs are disclosed, the present teachings are not limited to these specific dimensions. And the present teachings contemplate variations in such arc angle of for example, a plus or minus range of 5-15 degrees.

Magnet 300, which may be similar or identical to magnet 122, may be disposed proximal open end 124 of container 120. In an aspect, container 120 may include a lip 126. The lip 126 may extend from a body 128 of the container 120. The lip 126 may be configured such that it may be adjacent to a rim 136 of the blade base 130 when the container 120 and blade base 130 are operatively attached. Container 120 may comprise a single-walled or multi-walled container. In an example, container 120 may comprise a double-walled container having a first wall 150 and a second wall 152. The first wall 150 and second wall 152 may be of unitary construction or may comprise separate constructions joined together. In an aspect, the magnet 300 may be disposed between the first wall 150 and the second wall 152. The magnet 300 may be positioned such that it may trigger the switch 134. In another aspect, the container 120 may comprise one or more magnets 300.

In an aspect, the magnet 300 may provide a stronger intended field on the switch 134 over an operating range or sensitive range of the switch 134 in comparison with magnet 200. For example, the magnet 300 may generate a magnetic field that is weaker proximal the first end 302 and the second end 304 in comparison with center 304. Elongating the magnet 300 relative magnet 200 may allow for greater magnetic strength over a larger area.

The magnet 300 may have a length or arc that is generally between 1.1 and 2 times as large as a length or arc of magnet 200. For example, magnet 300 may have a length that is generally between w and q times the length of the magnet, wherein w and q are numbers. For instance, the length may be between 0.5-2.5 times larger than the length of the magnet 200. In an example, the length of magnet 300 may be 1.5 that of a length of magnet 200. In another example, magnet 300 may have an arc that is generally between r and s times the length of the magnet, wherein r and s are numbers (e.g., such as between 0.5-2.5). For instance, the magnet 300 may have an arc that is generally 1.5 that of the arc of magnet 200.

Figure 4:
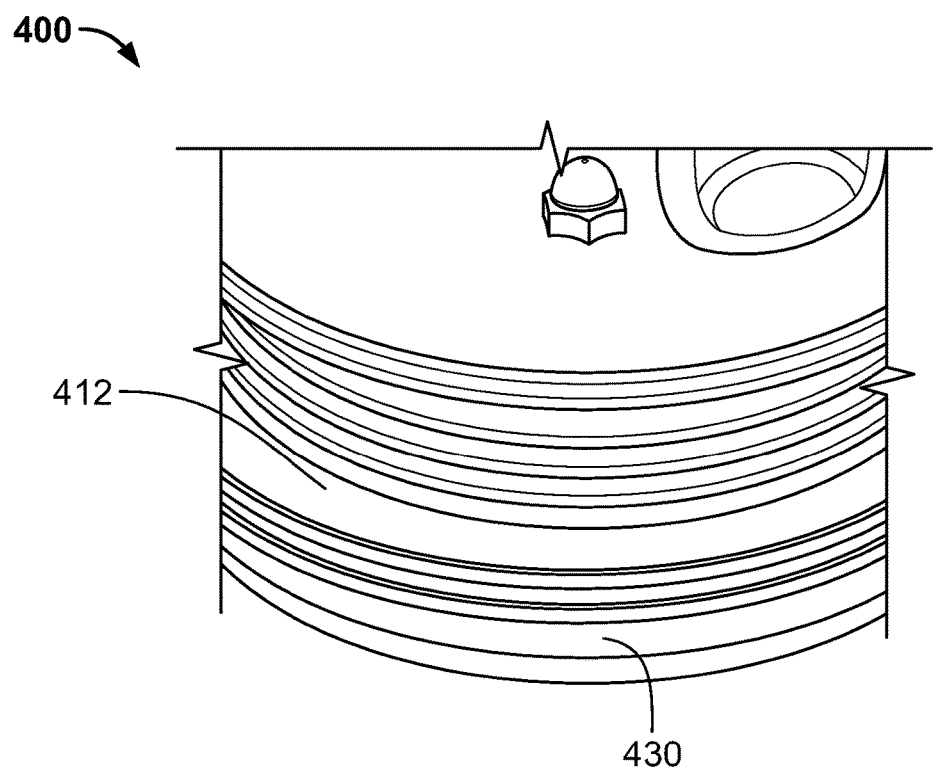
FIG. 4 is a side view of a blade assembly demonstrating the effect of a shield in accordance with various disclosed aspects.

To illustrate the effect of a shield 430 interfering with a motor's (e.g., motor 112) magnetic field, the shield 430 was compared to a baseline as shown in FIG. 4. Tests were run with a blade assembly 400 having a baseline having without shield 430. The shield 430 was then installed in a location where the interference began without a shield. The interference with the shield 430 moved closer to the ends of the magnet. A magnet 422, however, was strong enough to overcome the motor's magnetic field to reduce or prevent interference therefrom.

While examples describe a magnet or arc-shaped magnet of certain degrees, it is noted that other sized and shaped magnets may be utilized, such as an i degree arc magnet, where i is a number. While embodiments may refer to arc-shaped magnets, it is noted that magnets may include other shapes. In another aspect, the container 120 may include a different number of magnets, such as j magnets, where j is a number. Moreover, the trigger 122 may comprise a generally complete magnetic ring, a set of magnets positioned about lip 126, or the like.

Figure 5:
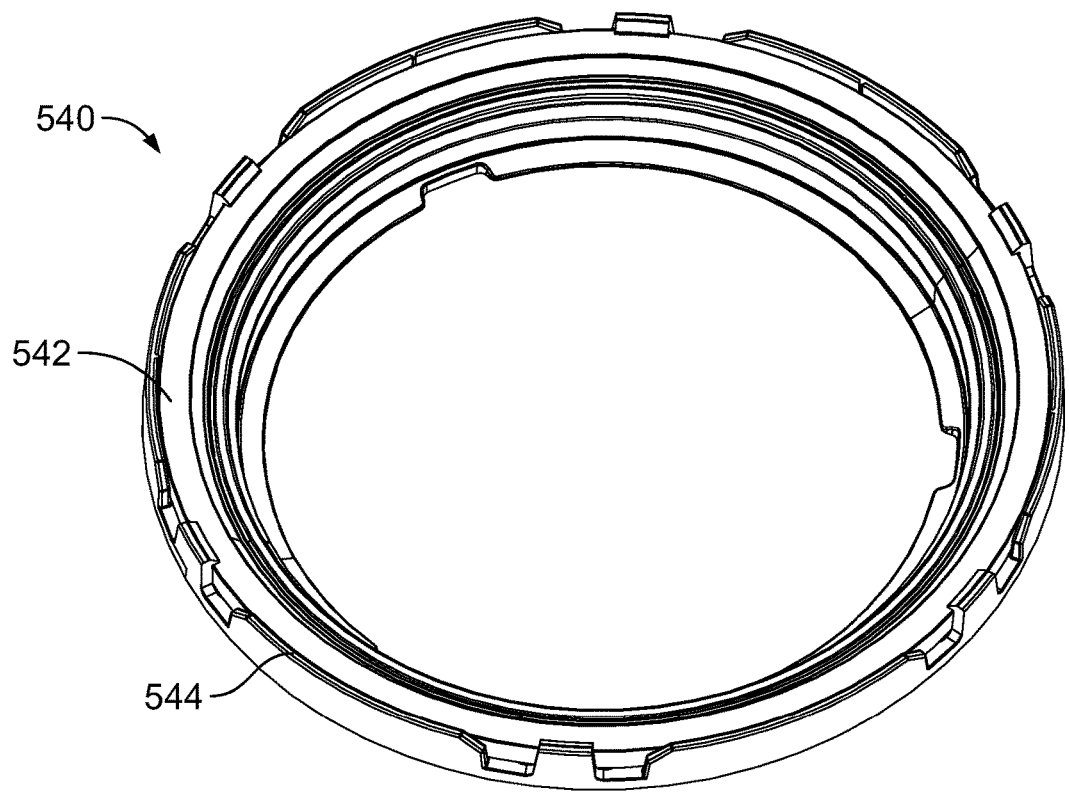
FIG. 5 is a perspective view of a shield for a blade assembly in accordance with various disclosed aspects.
Figure 6:
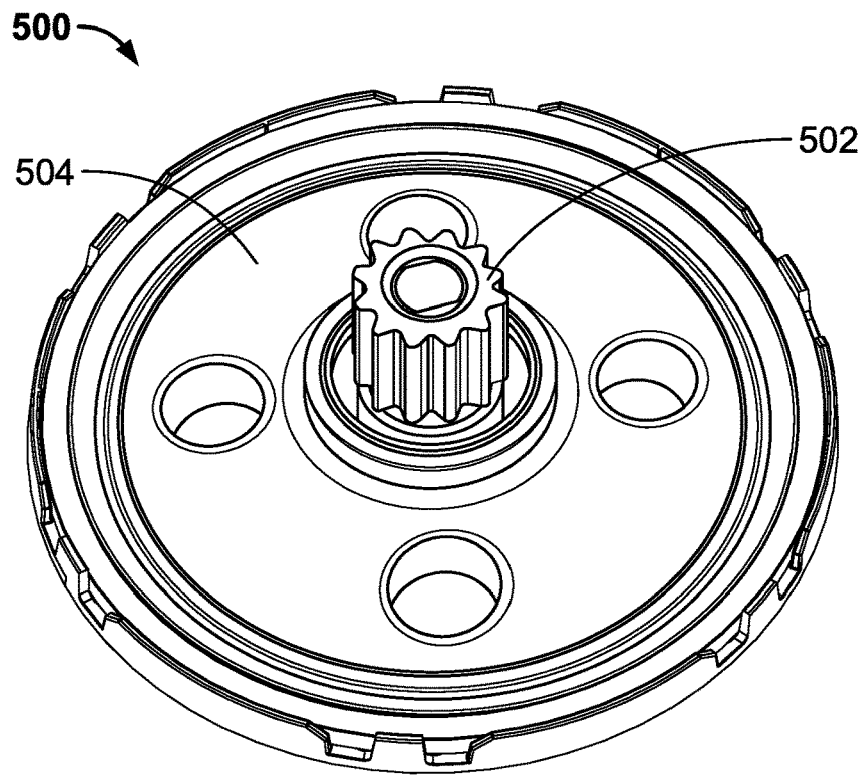
FIG. 6 is a bottom-perspective view of the shield and the blade assembly of FIG. 5 in accordance with various disclosed aspects.
Figure 7:
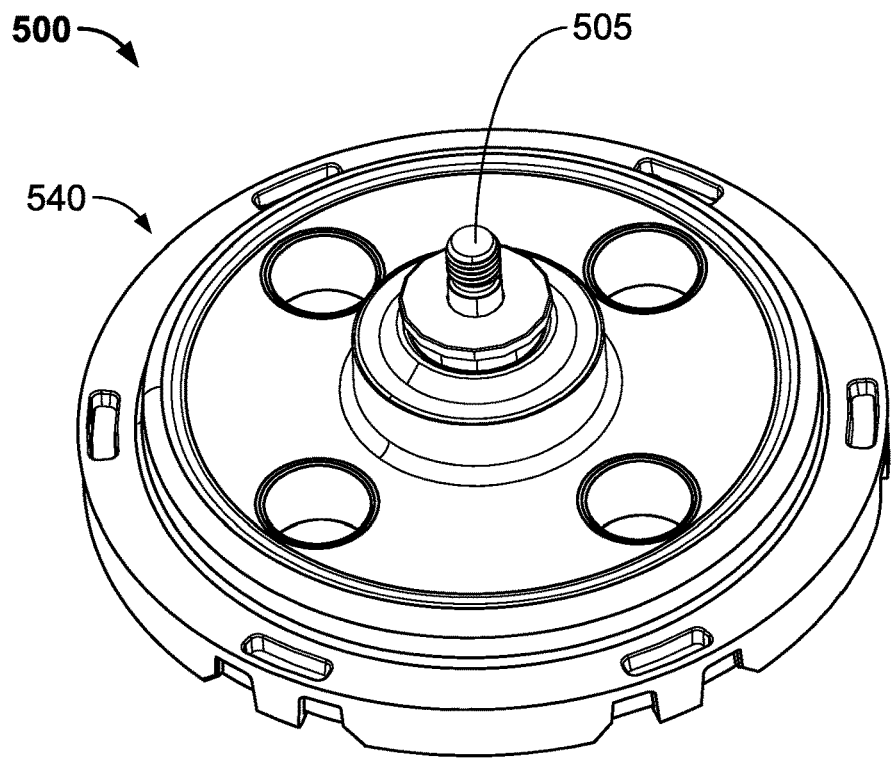
FIG. 7 is a top-perspective view of the shield and the blade assembly of FIG. 5 in accordance with various disclosed aspects.

FIGS. 5-7 depict a blade assembly 500 in accordance with embodiments of this disclosure. For instance, the blade assembly 500 may be utilized with blender system 100. The blade assembly 500 may include a splined coupler 502, a puck or body 504, a blade or agitator (not shown) that may be attached to a shaft 505, and a shield member 540. The shield member 540 may comprise a metallic body 542. The body 542 may comprise an appropriate material, such as steel. The body 542 may be disposed within or otherwise be coupled with a carrier 544.

It is noted that the shield member 540 may comprise similar aspects as described with reference to the other drawings. For instance, shield member 540 may comprise similar aspects as shield member 140. It is further noted that the shield member 540 may be utilized with an appropriate container, blade assembly, or the like.

In at least one embodiment, the carrier 544 may comprise a plastic material overmolded with the body 542. The carrier 544 may provide a mechanism for mounting the body 542 with the puck 504. For instance, the puck 504 may be press-fit with the carrier 544. In another aspect, the puck 504 and the body 542 may be overmolded with the carrier 544.

Figure 8:
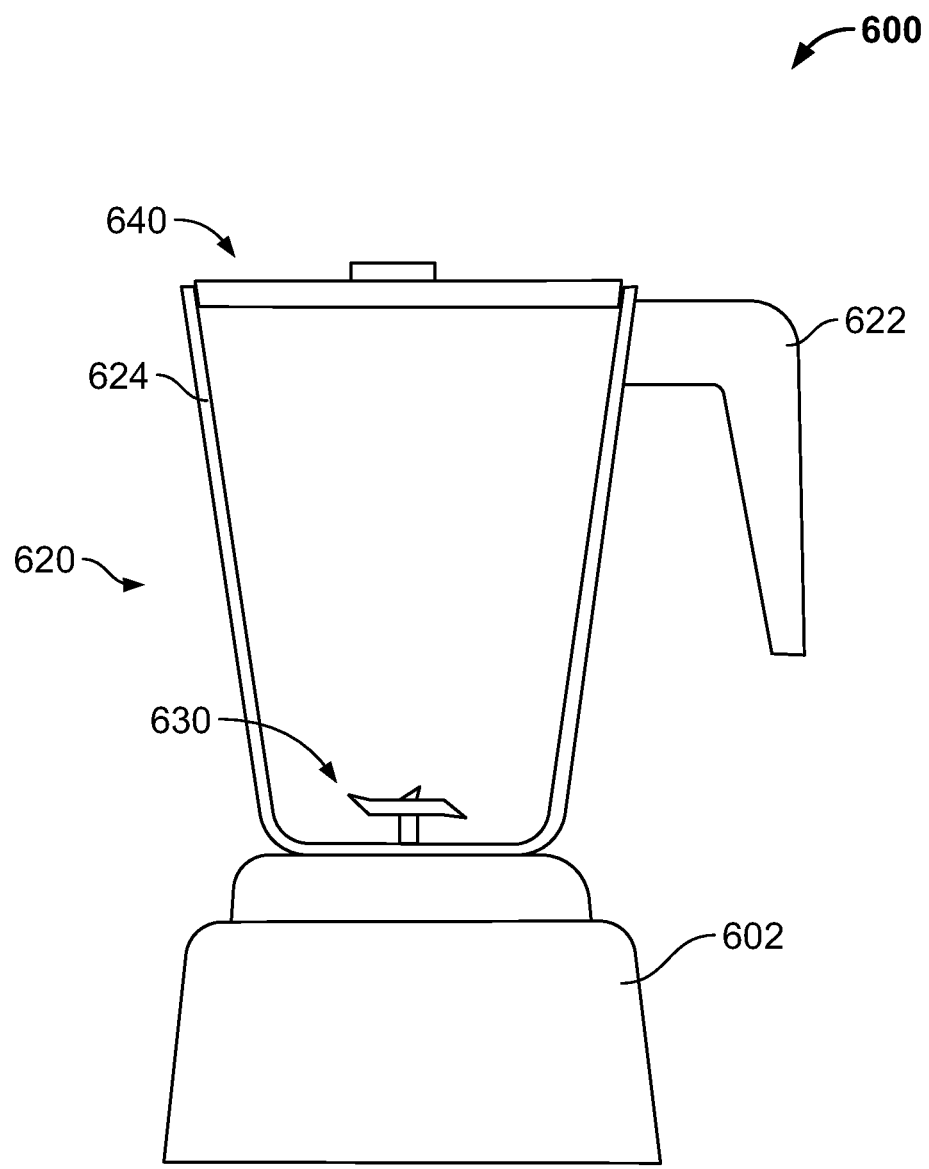
FIG. 8 is a front view of a blending system including a bifurcated seal, in accordance with various disclosed aspects.

FIG. 8 illustrates an exemplary blending system 600 in accordance with various disclosed embodiments. System 600 may utilize various disclosed aspects. For instance, system 600 may include a magnetic interference ring or shield as described with reference to FIGS. 1-7.

System 600 primarily includes a blender base 602, a container 620 operatively attachable to the blender base 602, a blade assembly 630 (which may include a shield member), and a lid 640 that may be operatively attached to the container. The container 620 may include walls 624 and a handle 622. Foodstuff may be added to the container 620 for blending. It is noted that the container 620 may comprise various materials such as plastics, glass, metals, or the like. In another aspect, container 620 may be powered in any appropriate manner, such as disclosed in U.S. patent application Ser. No. 14/213,557, entitled Powered Blending Container, which is hereby incorporated by reference.

The blade assembly 630, container 620, and base 602 may removably or irremovably attach. While shown as a large-format system, system 600 may comprise a single serving style container as described herein. The base 602 includes a motor disposed within a housing unit. The motor selectively drives the blade assembly 630 (e.g., cutting blades, chopping blades, whipping blades, spiralizing blades, etc.). The blade assembly 630 may agitate, impart heat, or otherwise interact with contents within the container. Operation of the blender system 600 may impart heat into the contents within container 620.

In at least one embodiment, the blending system 600 may identify or detect whether the system 600 is interlocked through a magnetic detection (e.g., reed switches) as described herein. A shield member may block interference with the reed switch by a magnetic field generated by the motor in accordance with various disclosed aspects.

System 600 and processes described herein generally relate to blending or food-processing systems and include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base and may utilize the information to determine a blending process to be utilized by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A blender system comprising:
    a base including a motor;
    a container comprising at least one magnet; and
    a blade base operatively attachable to the container and the base, the blade base comprising:
        a blade assembly;
        a switch that interacts with the magnet when the magnet is within an operating range of the switch, wherein the switch and the magnet are disposed above the motor of the base when the blade base, the container, and the base are operatively attached together; and
        a shield comprising a metal body that is disposed between the switch and the motor of the base when the blade base is operatively attached to the container and the base, wherein the shield operatively blocks a magnetic field generated by operation of the motor.

2. The blender system of claim 1, wherein the metal body comprises steel.

3. The blender system of claim 1, wherein the container comprises at least two magnets.

4. The blender system of claim 1, wherein the magnet comprises an arc-shape that is less than 360 degrees.

5. The blender system of claim 4, wherein the arc-shape is seventy-five degrees or greater.

6. The blender system of claim 1, wherein the container comprises an inner layer and an outer layer, and wherein the magnet is disposed between the inner layer and the outer layer.

7. The blender system of claim 1, wherein the switch comprises a reed switch.

8. A blender system for blending foodstuff, the blender system comprising:
    a base comprising a housing and a motor;
    a container comprising a magnet disposed proximal to an opening of the container;
    a blade base operatively and removably attachable to the container and the housing of the base, wherein the blade base comprises a blade assembly, at least one switch that operatively alters a state based on interactions with the magnet, and wherein the switch and magnet are operatively disposed above the motor when the blade base, the container, and the housing are operatively attached together; and a shield comprising a metal body that is disposed between the at least one switch and the motor of the base when the blade base is operatively attached to a top of the base, wherein the shield is capable of blocking a magnetic field generated by operation of the motor.

9. The blender system of claim 8, wherein the shield is disposed within the base.

10. The blender system of claim 8, wherein the shield is disposed within the blade base.

11. The blender system of claim 8, wherein the at least one switch comprises a reed switch.

12. The blender system of claim 8, wherein the at least one switch operatively enables operation of the motor when the magnet is within an operating field of the at least one switch and disables operation of the motor when the magnet is not within the operating filed of the at least one switch.

13. The blender system of claim 8, wherein the shield further comprises a carrier coupled with the metal body.

14. The blender system of claim 13, wherein the carrier is overmolded with the metal body.

15. The blender system of claim 14, wherein the blade base further comprises a body, a shaft, and at least one blade, and wherein the carrier is operatively attached to the body.

16. The blender system of claim 8, wherein the base is operatively attachable with at least one other container having a different volume than the container.

* * * * *